United States Patent
Lee et al.

(10) Patent No.: US 12,139,160 B2
(45) Date of Patent: Nov. 12, 2024

(54) VEHICLE CONTROL METHOD AND INTELLIGENT COMPUTING DEVICE FOR CONTROLLING VEHICLE

(71) Applicant: LG ELECTRONICS INC., Seoul (KR)

(72) Inventors: Yonghwan Lee, Seoul (KR); Kihyeon Kim, Seoul (KR); Ahyoung Shin, Seoul (KR); Jongyeop Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 304 days.

(21) Appl. No.: 17/625,710

(22) PCT Filed: Jul. 10, 2019

(86) PCT No.: PCT/KR2019/008510
§ 371 (c)(1),
(2) Date: Jan. 7, 2022

(87) PCT Pub. No.: WO2021/006386
PCT Pub. Date: Jan. 14, 2021

(65) Prior Publication Data
US 2022/0274617 A1    Sep. 1, 2022

(51) Int. Cl.
*B60W 50/14*    (2020.01)
*B60W 50/10*    (2012.01)
*G06F 16/23*    (2019.01)

(52) U.S. Cl.
CPC ............ *B60W 50/14* (2013.01); *B60W 50/10* (2013.01); *G06F 16/23* (2019.01); *B60W 2050/146* (2013.01); *B60W 2540/215* (2020.02)

(58) Field of Classification Search
None
See application file for complete search history.

(56) References Cited

U.S. PATENT DOCUMENTS

| 10,458,806 B2 * | 10/2019 | Chen ................. G01C 21/3484 |
| 2014/0365228 A1 * | 12/2014 | Ng-Thow-Hing ...... G06F 3/017 |
| | | 704/275 |

(Continued)

FOREIGN PATENT DOCUMENTS

| KR | 20120091495 | 8/2012 |
| KR | 20150103855 | 9/2015 |

(Continued)

OTHER PUBLICATIONS

Clint Boessen, How to Delete Files which exceed 255 Characters Without 3rdParty Tools, 2014 (Year: 2014).*

(Continued)

*Primary Examiner* — James J Lee
*Assistant Examiner* — Andrew Sang Kim
(74) *Attorney, Agent, or Firm* — LEE, HONG, DEGERMAN, KANG & WAIMEY

(57) ABSTRACT

Disclosed are a vehicle control method and an intelligent device for controlling a vehicle. A vehicle control method according to an embodiment of the present disclosure comprises: acquiring a user request; updating the user request so as to be recognized by an application providing a service related to the user request, and providing the updated user request to the application; and providing the service through the application. Accordingly, the present invention can accurately and promptly recognize words in various forms, included in a user request, thereby providing a comparatively accurate service in accordance with the user request. One or more of an autonomous driving vehicle and an intelligent computing device of the present disclosure may be linked to an artificial intelligence module, a drone (unmanned aerial vehicle, UAV), a robot, an augmented reality (AR) device, a virtual reality (VR) device, a device related to 5G services, and the like.

11 Claims, 8 Drawing Sheets

(56) References Cited

U.S. PATENT DOCUMENTS

2019/0311713 A1* 10/2019 Talwar .................... G06F 40/30
2019/0392040 A1* 12/2019 Puniyani .............. H04N 21/482
2020/0026288 A1* 1/2020 Herz .................. G01C 21/3664

FOREIGN PATENT DOCUMENTS

| KR | 20160097032 | 8/2016 |
| KR | 1020180064504 | 6/2018 |
| WO | 2018217014 | 11/2018 |

OTHER PUBLICATIONS

PCT International Application No. PCT/KR2019/008510, International Search Report dated Apr. 7, 2020, 4 pages.

* cited by examiner

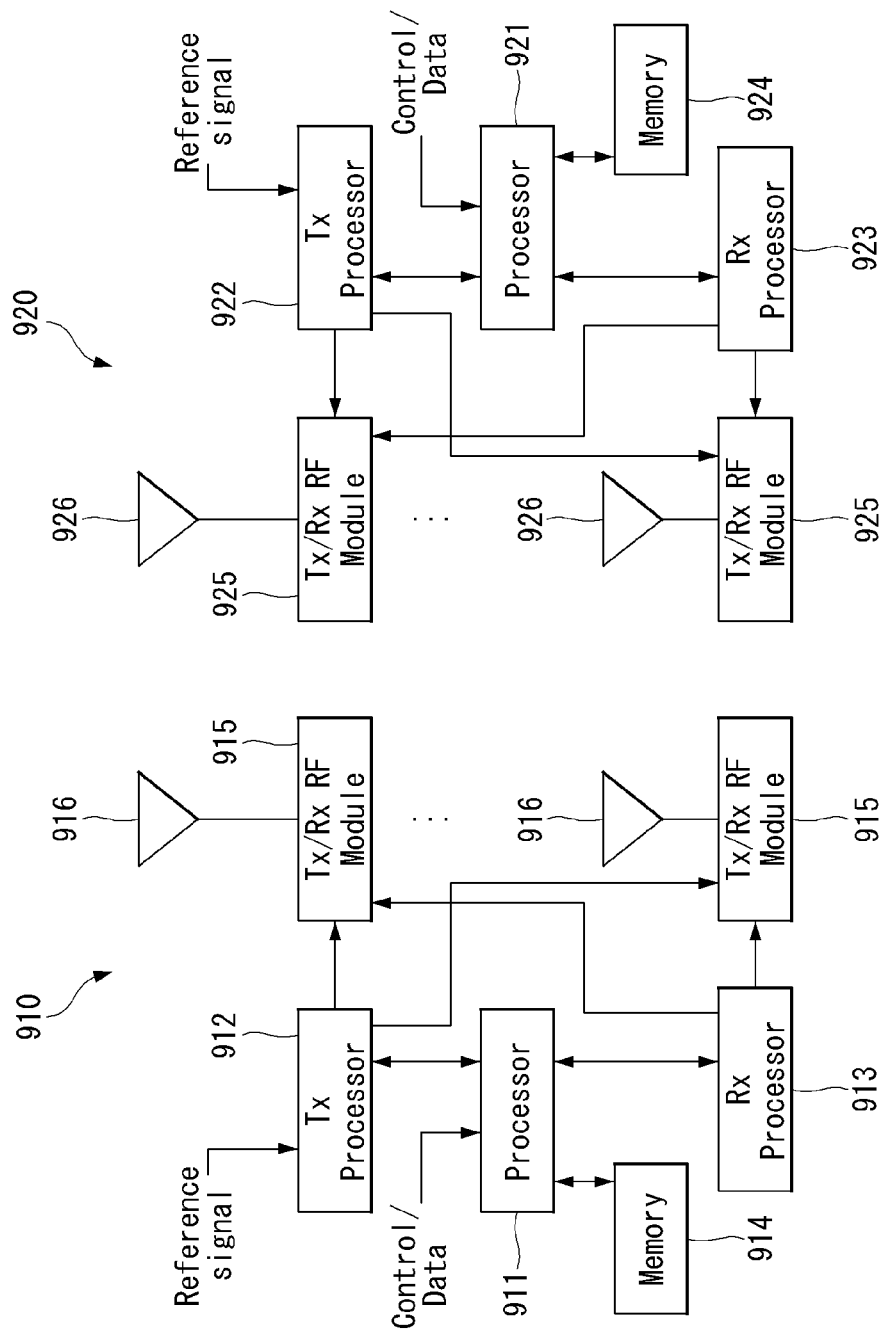
[FIG. 1]

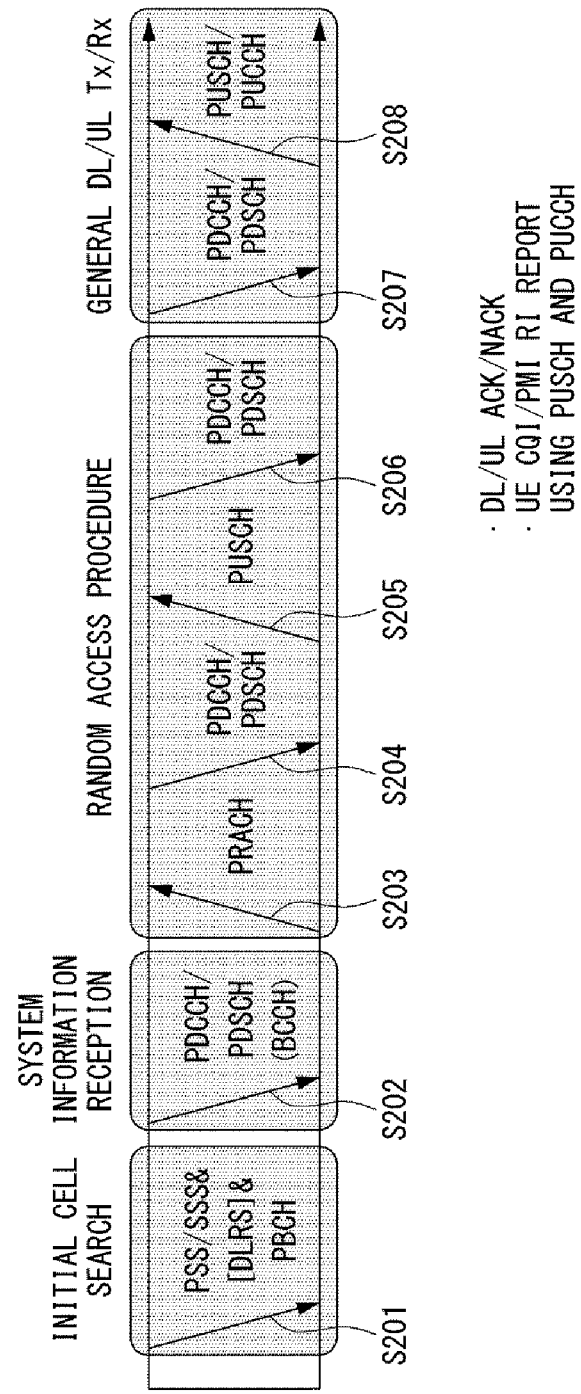
[FIG. 2]

[FIG. 3]
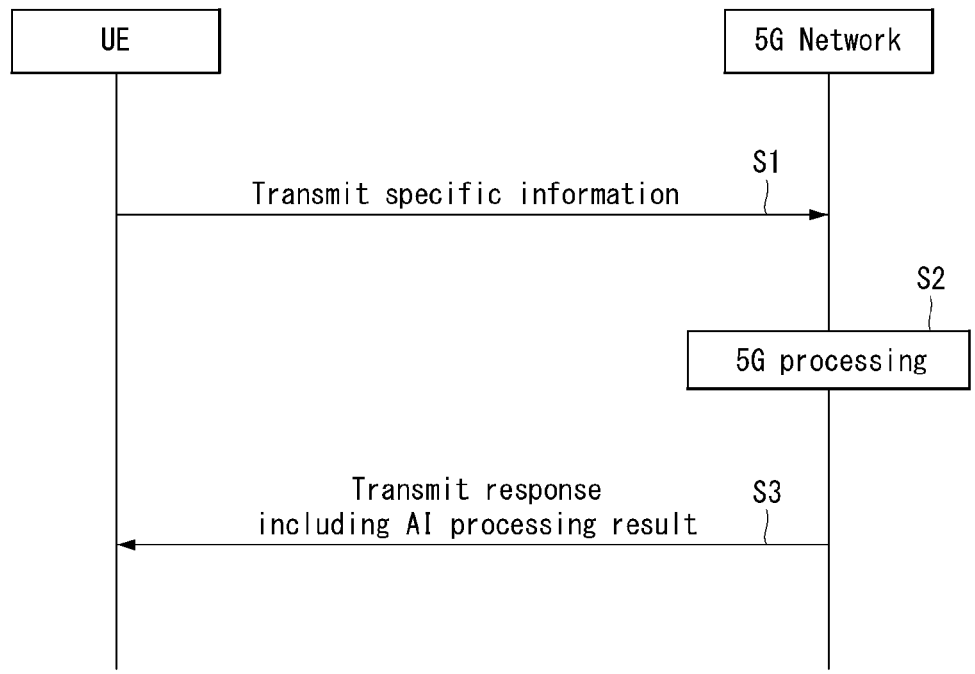

[FIG. 4]
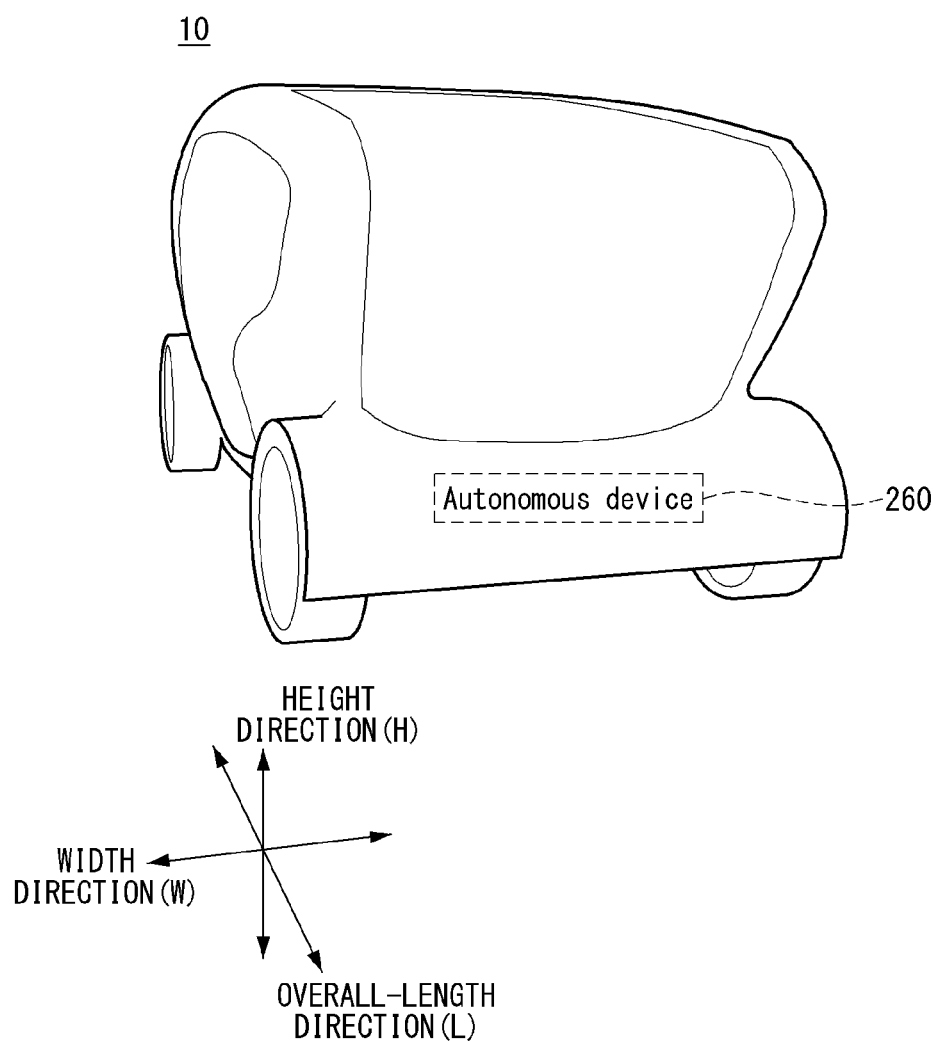

【FIG. 5】
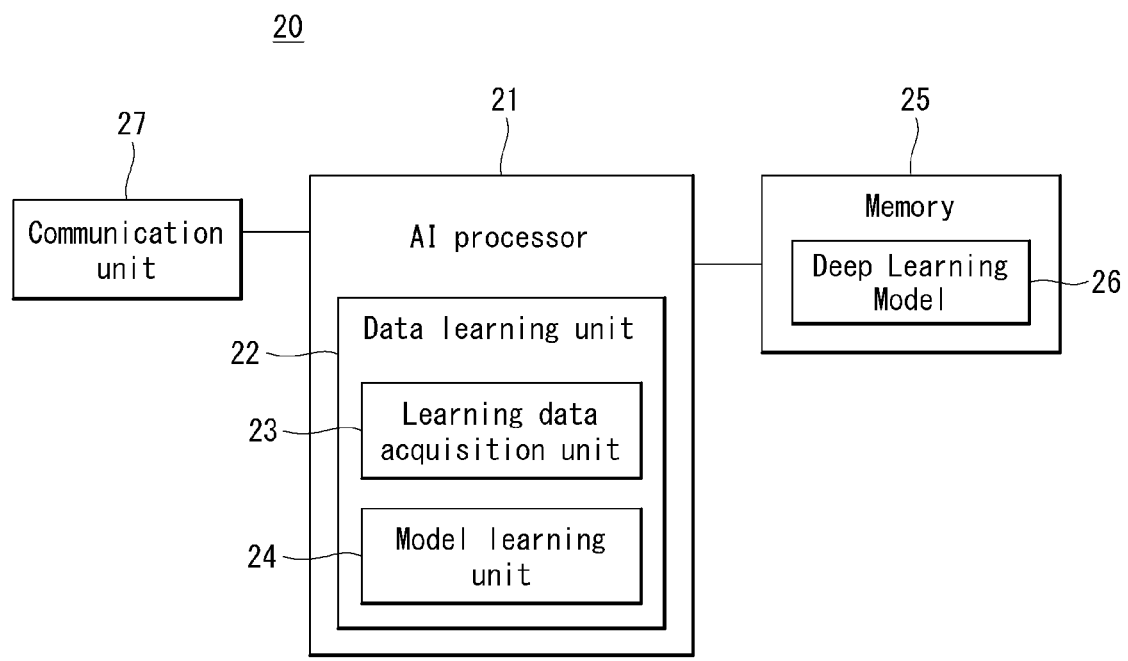

[FIG. 6]
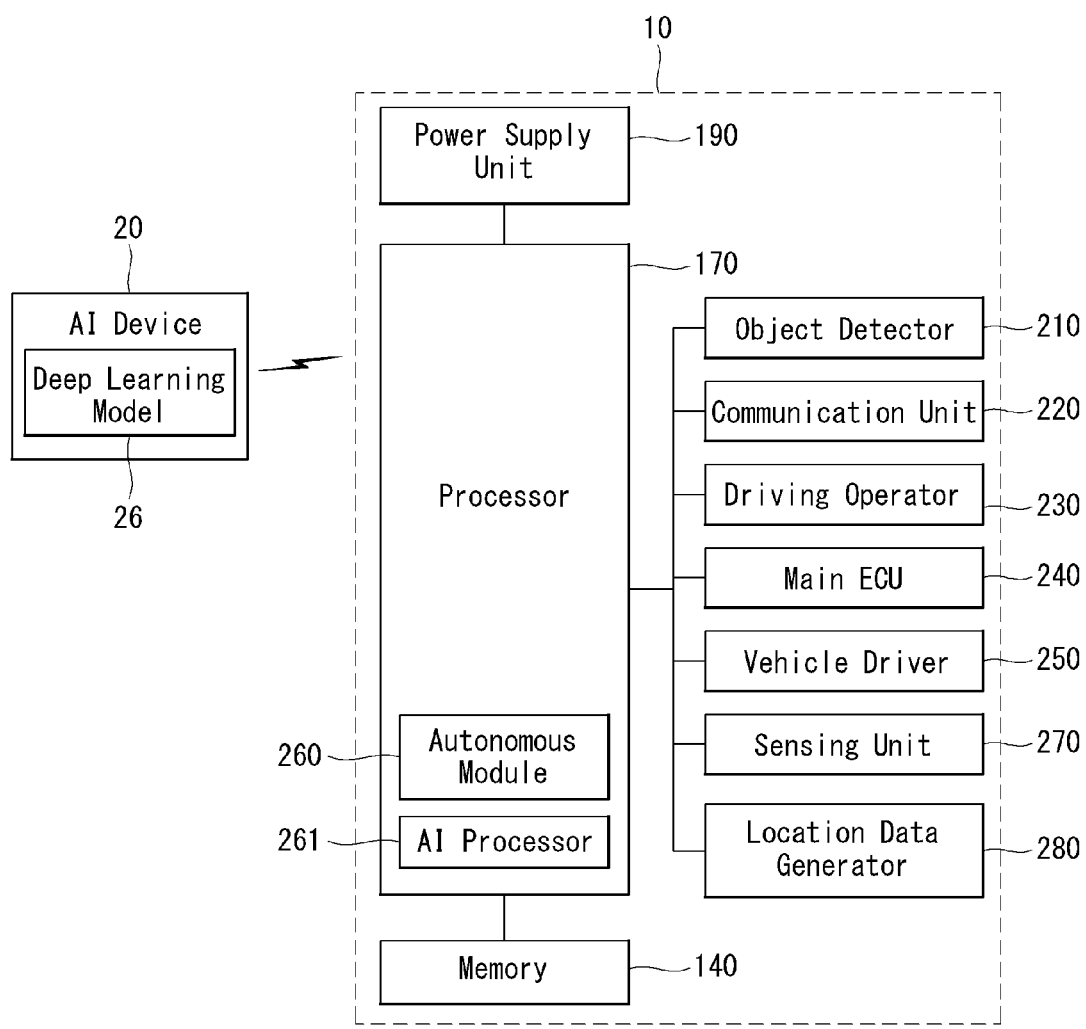

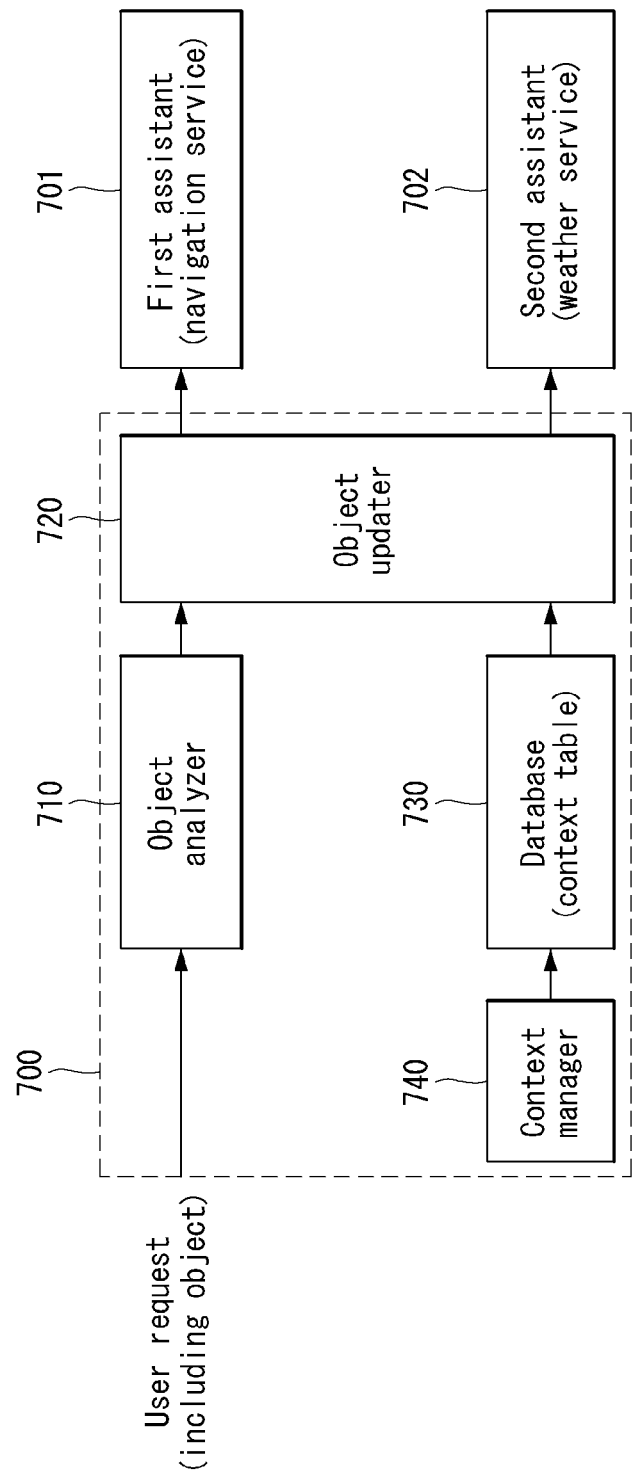
[FIG. 7]

[FIG. 8]
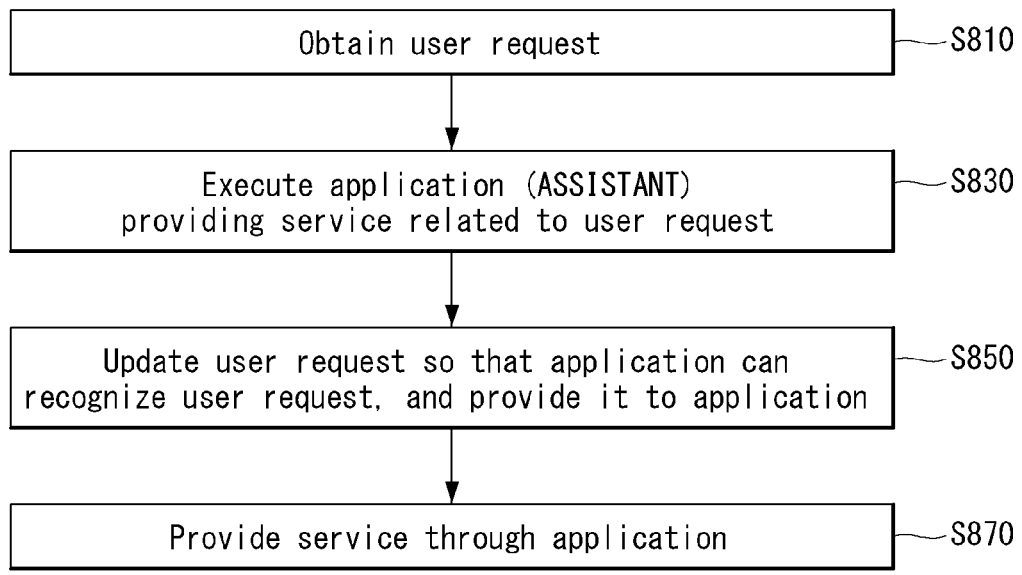

VEHICLE CONTROL METHOD AND INTELLIGENT COMPUTING DEVICE FOR CONTROLLING VEHICLE

CROSS-REFERENCE TO RELATED APPLICATIONS

This application is the National Stage filing under 35 U.S.C. 371 of International Application No. PCT/KR2019/008510, filed on Jul. 10, 2019, the contents of which are all incorporated by reference herein in its entirety.

TECHNICAL FIELD

The present disclosure relates to a vehicle control method and an intelligent computing device controlling a vehicle, and more particularly to a vehicle control method and an intelligent computing device controlling a vehicle capable of providing the convenience of a user command.

BACKGROUND ART

Vehicles can be classified into an internal combustion engine vehicle, an external composition engine vehicle, a gas turbine vehicle, an electric vehicle, etc. according to types of motors used therefor.

An autonomous vehicle refers to a self-driving vehicle that can travel without an operation of a driver or a passenger, and automated vehicle & highway systems refer to systems that monitor and control the autonomous vehicle such that the autonomous vehicle can perform self-driving.

A vehicle is one of the means of transportation that moves a user in a desired direction, and a typical example of the vehicle may include an automobile. Instead that the vehicle provides the user with the convenience of movement, the user should pay close attention to the front and the rear while driving. Here, the front and the rear may mean objects approaching the vehicle or located around the vehicle, i.e., driving obstacles such as a person, a vehicle, and an obstacle.

DISCLOSURE

Technical Problem

An object of the present disclosure is to address the above-described needs and/or problems.

Another object of the present disclosure is to implement a vehicle control method and an intelligent computing device controlling a vehicle providing the convenience with which a user gives commands.

Technical Solution

In one aspect of the present disclosure, there is provided a method of controlling a vehicle, the method comprising obtaining a user request related to the controlling of the vehicle; executing an application providing a service related to the user request; providing the user request to the application; and providing the service through the application, wherein the providing of the user request comprises updating the user request to be recognizable by the application and providing the updated user request to the application.

The providing of the user request may comprise updating an object included in the user request to be recognizable by the application.

The providing of the user request may comprise searching a database shared by a plurality of applications for a context meeting a rule of the application to update the object.

The providing of the user request may comprise searching the database for a context satisfying a condition related to a demonstrative pronoun when the object includes the demonstrative pronoun.

The providing of the user request may comprise searching a context most recently stored in the database among contexts satisfying the condition.

The method may further comprise updating the database using the object included in the user request.

The updating of the database may be performed according to a destination setting through a map touch input or a menu input.

The updating of the database may be performed by using a response to providing the updated user request to the application.

The method may further comprise, when a session related to the user request is terminated, deleting a first object having a length less than or equal to a threshold.

The method may further comprise, when a deletion request for a second object having a length greater than or equal to a threshold is received from an outside, deleting the second object from the database.

The providing of the user request may comprise updating a first format of the user request to a second format based on a recognition rule of the application.

The method may further comprise, when the user request includes a request for another service different from the service provided by the application, executing an application corresponding to the request for the another service.

In another aspect of the present disclosure, there is provided an intelligent computing device controlling a vehicle, comprising a camera provided inside the vehicle; a head-up display; a sensing unit including at least one sensor; a processor; and a memory including a command executable by the processor, wherein the command is configured for obtaining a user request related to the controlling of the vehicle, executing an application providing a service related to the user request, updating the user request to be recognizable by the application and providing the updated user request to the application, and providing the service through the application.

The processor may be configured to update an object included in the user request to be recognizable by the application.

The processor may be further configured to search a database shared by a plurality of applications for a context meeting a rule of the application and update the object.

The processor may be further configured to search the database for a context satisfying a condition related to a demonstrative pronoun when the object includes the demonstrative pronoun.

The processor may be further configured to search a context most recently stored in the database among contexts satisfying the condition.

The processor may be further configured to update the database using the object included in the user request.

The processor may be further configured to perform the updating according to a destination setting through a map touch input or a menu input.

In another aspect of the present disclosure, there is provided a non-transitory computer readable medium storing a computer executable component configured to be executed by one or more processors of a computing device, wherein the computer executable component is configured to obtain a user request related to controlling of a vehicle, execute an application providing a service related to the user request, update the user request to be recognizable by the application and provide the updated user request to the application, and provide the service through the application.

Advantageous Effects

Effects of a vehicle control method and an intelligent computing device controlling a vehicle according to an embodiment of the present disclosure are described as follows.

The present disclosure can accurately and rapidly recognize various formats of words included in a user request by updating a format of an object included in the user request to a format recognizable by an assistant system, and thus relatively accurately provide a service suitable for the user request.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates a block diagram of configuration of a wireless communication system to which methods described in the present disclosure are applicable.

FIG. 2 illustrates an example of signal transmitting/receiving method in a wireless communication system.

FIG. 3 illustrates an example of basic operation of a user equipment and a 5G network in a 5G communication system.

FIG. 4 illustrates a vehicle according to an embodiment of the present disclosure.

FIG. 5 is a block diagram of an AI device according to an embodiment of the present disclosure.

FIG. 6 illustrates a system, in which an autonomous vehicle and an AI device are associated, according to an embodiment of the present disclosure.

FIG. 7 is a block diagram of an intelligent computing device according to an embodiment of the present disclosure.

FIG. 8 is a flow chart illustrating a vehicle control method according to an embodiment of the present disclosure.

The accompanying drawings, which are included to provide a further understanding of the present disclosure and constitute a part of the detailed description, illustrate embodiments of the present disclosure and serve to explain technical features of the present disclosure together with the description.

MODE FOR DISCLOSURE

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, the 5th generation mobile communication required by a device and/or an AI processor requiring AI-processed information will be described through paragraphs A to G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed autonomous operations.

A 5G network including another device (AI server) communicating with the AI device is defined as a second device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmitter UE, a receiver UE, a wireless device, a wireless communication device, a vehicle, a vehicle with a self-driving function, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service, or a device related to the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flight vehicle that flies by a radio control signal without a person being on the flight vehicle. For example, the VR device may include a device that implements an object or a background, etc. of a virtual world. For example, the AR device may include a device implemented by connecting an object or a background of a virtual world to an object or a background, etc. of a real world. For example, the MR device may include a device implemented by merging an object or a background of a virtual world with an object or a background, etc. of a real world. For example, the hologram device may include a device that records and reproduces stereoscopic information to implement a 360-degree stereoscopic image by utilizing a phenomenon of interference of light generated when two laser beams called holography meet. For example, the public safety device may include a video relay device or a video device that can be worn on the user's body. For example, the MTC device and the IoT device may be a device that does not require a person's direct intervention or manipulation. For example, the MTC device and the IoT device may include a smart meter, a vending machine, a thermometer, a smart bulb, a door lock, a variety of sensors, or the like. For example, the medical device may be a device used for the purpose of diagnosing, treating, alleviating, handling or preventing a disease. For example, the medical device may be a device used for the purpose of diagnosing, treating, alleviating or correcting an injury or a disorder. For example, the medical device may be a device used for the purpose of testing, substituting or modifying a structure or a function. For example, the medical device may be a device used for the purpose of controlling pregnancy. For example, the medical device may include a medical device, a surgical device, a (in vitro) diagnostic device, a hearing aid or a device for a surgical procedure, and the like. For example, the security device may be a device installed to prevent a possible danger and to maintain safety. For example, the security device may include a camera, CCTV, a recorder, or a black box, and the like. For example, the FinTech device may be a device capable of providing financial services, such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

According to an embodiment of the present disclosure, the first communication device may be a vehicle, and the second communication device may be a 5G network.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) returning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of a user equipment and a 5G network in a 5G communication system.

The UE transmits specific information to the 5G network, in S1. The 5G network performs 5G processing on the specific information, S2. The 5G processing may include AI processing. The 5G network sends a response including a result of AI processing to the UE, in S3.

G. Applied Operations Between User Equipment and 5G Network in 5G Communication System Hereinafter, the operation of an AI using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the UE performs an initial access procedure and a random access procedure with the 5G network prior to step S1 of FIG. 3 in order to transmit/receive signals, information and the like to/from the 5G network.

More specifically, the UE performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network can transmit, to the UE, a UL grant for scheduling transmission of specific information. Accordingly, the UE transmits the specific information to the 5G network on the basis of the UL grant. In addition, the 5G network transmits, to the UE, a DL grant for scheduling transmission of 5G processing results with respect to the specific information. Accordingly, the 5G network can transmit, to the UE, the response including an AI processing result.

Next, a basic procedure of an applied operation to which a method proposed by the present disclosure which will be described later and URLLC of 5G communication are applied will be described.

As described above, an UE can receive DownlinkPreemption IE from the 5G network after the UE performs an initial access procedure and/or a random access procedure with the 5G network. Then, the UE receives DCI format 2_1 including a preemption indication from the 5G network on the basis of DownlinkPreemption IE. The UE does not perform (or expect or assume) reception of eMBB data in resources (PRBs and/or OFDM symbols) indicated by the preemption indication. Thereafter, when the UE needs to transmit specific information, the UE can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the UE receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The 5G communication technology reviewed above may be applied in combination with the methods proposed in the present disclosure to be described later, or may be supplemented to specify or clarify the technical characteristics of the methods proposed in the present disclosure.

FIG. 4 is a diagram showing a vehicle according to an embodiment of the present disclosure.

Referring to FIG. 4, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

FIG. 5 is a block diagram of an AI device according to an embodiment of the present disclosure.

An AI device 20 may include an electronic device including an AI module that can perform AI processing, or a server including the AI module, and the like. The AI device 20 may be included as at least a partial configuration of the vehicle 10 illustrated in FIG. 1 to perform at least a part of the AI processing.

The AI processing may include all operations related to the driving of the vehicle 10 illustrated in FIG. 4. For example, an autonomous vehicle may perform the AI processing on sensing data or driver data to perform a processing/determination operation and a control signal generation operation. For example, the autonomous vehicle may also perform the autonomous driving control by performing AI processing on data acquired through an interaction with other electronic devices included inside the autonomous vehicle.

The AI device 20 may include an AI processor 21, a memory 25, and/or a communication unit 27.

The AI device 20 is a computing device capable of learning a neural network and may be implemented as various electronic devices including a server, a desktop PC, a notebook PC, a tablet PC, and the like.

The AI processor 21 may learn a neural network using a program stored in the memory 25. In particular, the AI processor 21 may learn a neural network for recognizing vehicle related data. The neural network for recognizing the vehicle related data may be designed to emulate a human brain structure on a computer and may include a plurality of network nodes with weights that emulate neurons in a human neural network. The plurality of network nodes may send and receive data according to each connection relationship so that neurons emulate the synaptic activity of neurons sending and receiving signals through synapses. Herein, the neural network may include a deep learning model which has evolved from a neural network model. In the deep learning model, a plurality of network nodes may be arranged in different layers and may send and receive data according to a convolution connection relationship. Examples of the neural network model may include various deep learning techniques, such as deep neural networks (DNN), convolutional deep neural networks (CNN), recurrent Boltzmann machine (RNN), restricted Boltzmann machine (RBM), deep belief networks (DBN), and deep Q-networks, and are applicable to fields including computer vision, voice recognition, natural language processing, and voice/signal processing, etc.

A processor performing the above-described functions may be a general purpose processor (e.g., CPU), but may be AI-dedicated processor (e.g., GPU) for AI learning.

The memory 25 may store various programs and data required for the operation of the AI device 20. The memory 25 may be implemented as a non-volatile memory, a volatile memory, a flash memory, a hard disk drive (HDD), or a solid state drive (SSD), etc. The memory 25 may be accessed by the AI processor 21, and the AI processor 21 may read/write/modify/delete/update data. Further, the memory 25 may store a neural network model (e.g., deep learning model 26) created by a learning algorithm for data classification/recognition according to an embodiment of the present disclosure.

The AI processor 21 may further include a data learning unit 22 for learning a neural network for data classification/recognition. The data learning unit 22 may learn criteria as to which learning data is used to determine the data classification/recognition and how to classify and recognize data using learning data. The data learning unit 22 may learn a deep learning model by acquiring learning data to be used in the learning and applying the acquired learning data to the deep learning model.

The data learning unit 22 may be manufactured in the form of at least one hardware chip and mounted on the AI device 20. For example, the data learning unit 22 may be manufactured in the form of a dedicated hardware chip for artificial intelligence (AI), or may be manufactured as a part of a general purpose processor (e.g., CPU) or a graphic-dedicated processor (e.g., GPU) and mounted on the AI device 20. Further, the data learning unit 22 may be implemented as a software module. If the data learning unit 22 is implemented as the software module (or a program module including instruction), the software module may be stored in non-transitory computer readable media. In this case, at least one software module may be provided by an operating system (OS), or provided by an application.

The data learning unit 22 may include a learning data acquisition unit 23 and a model learning unit 24.

The learning data acquisition unit 23 may acquire learning data required for a neural network model for classifying and recognizing data. For example, the learning data acquisition unit 23 may acquire, as learning data, data and/or sample data of the vehicle to be input to a neural network model.

By using the acquired learning data, the model learning unit 24 may learn so that the neural network model has a criteria for determining how to classify predetermined data. In this instance, the model learning unit 24 may train the neural network model through supervised learning which uses at least a part of the learning data as the criteria for determination. Alternatively, the model learning unit 24 may train the neural network model through unsupervised learning which finds criteria for determination by allowing the neural network model to learn on its own using the learning data without supervision. Further, the model learning unit 24 may train the neural network model through reinforcement learning using feedback about whether a right decision is made on a situation by learning. Further, the model learning unit 24 may train the neural network model using a learning algorithm including error back-propagation or gradient descent.

If the neural network model is trained, the model learning unit 24 may store the trained neural network model in the memory. The model learning unit 24 may store the trained neural network model in a memory of a server connected to the AI device 20 over a wired or wireless network.

The data learning unit 22 may further include a learning data pre-processing unit (not shown) and a learning data selection unit (not shown), in order to improve a result of analysis of a recognition model or save resources or time required to create the recognition model.

The learning data pre-processing unit may pre-process acquired data so that the acquired data can be used in learning for determining the situation. For example, the learning data pre-processing unit may process acquired learning data into a predetermined format so that the model learning unit 24 can use the acquired learning data in learning for recognizing images.

Moreover, the learning data selection unit may select data required for learning among learning data acquired by the learning data acquisition unit 23 or learning data pre-processed by the pre-processing unit. The selected learning data may be provided to the model learning unit 24. For example, the learning data selection unit may detect a specific area in an image obtained by a camera of the vehicle to select only data for objects included in the specific area as learning data.

In addition, the data learning unit 22 may further include a model evaluation unit (not shown) for improving the result of analysis of the neural network model.

The model evaluation unit may input evaluation data to the neural network model and may allow the model learning unit 22 to learn the neural network model again if a result of analysis output from the evaluation data does not satisfy a predetermined criterion. In this case, the evaluation data may be data that is pre-defined for evaluating the recognition model. For example, if the number or a proportion of evaluation data with inaccurate analysis result among analysis results of the recognition model learned on the evaluation data exceeds a predetermined threshold, the model evaluation unit may evaluate the analysis result as not satisfying the predetermined criterion.

The communication unit 27 may send an external electronic device a result of the AI processing by the AI processor 21.

The external electronic device may be defined as an autonomous vehicle. The AI device 20 may be defined as another vehicle or a 5G network that communicates with the autonomous vehicle. The AI device 20 may be implemented by being functionally embedded in an autonomous module included in the autonomous vehicle. The 5G network may include a server or a module that performs an autonomous related control.

Although the AI device 20 illustrated in FIG. 5 is functionally separately described into the AI processor 21, the memory 25, the communication unit 27, etc., the above components may be integrated into one module and referred to as an AI module.

FIG. 6 illustrates a system, in which an autonomous vehicle is associated with an AI device, according to an embodiment of the present disclosure.

Referring to FIG. 6, the autonomous vehicle 10 may transmit data requiring the AI processing to the AI device 20 through a communication unit, and the AI device 20 including the deep learning model 26 may send, to the autonomous vehicle 10, a result of the AI processing obtained using the deep learning model 26. The AI device 20 may refer to the description with reference to FIG. 2.

The autonomous vehicle 10 may include a memory 140, a processor 170 and a power supply unit 190, and the processor 170 may include an autonomous module 260 and an AI processor 261. The autonomous vehicle 10 may further include an interface which is connected wiredly or wirelessly to at least one electronic device included in the autonomous vehicle 10 and can exchange data necessary for an autonomous driving control. The at least one electronic device connected through the interface may include an object detector 210, a communication unit 220, a driving operator 230, a main electronic control unit (ECU) 240, a vehicle driver 250, a sensing unit 270, and a location data generator 280.

The interface may be configured as at least one of a communication module, a terminal, a pin, a cable, a port, a circuit, an element, or a device.

The memory 140 is electrically connected to the processor 170. The memory 140 can store basic data about a unit, control data for operation control of a unit, and input/output data. The memory 140 can store data processed in the processor 170. The memory 140 may be configured hardware-wise as at least one of a ROM, a RAM, an EPROM, a flash drive, or a hard drive. The memory 140 can store various types of data for overall operation of the autonomous vehicle 10, such as a program for processing or control of the processor 170. The memory 140 may be integrated with the processor 170. According to an embodiment, the memory 140 may be categorized as a subcomponent of the processor 170.

The power supply unit 190 may provide power to the autonomous vehicle 10. The power supply unit 190 may receive power from a power source (e.g., a battery) included in the autonomous vehicle 10 and supply power to each unit of the autonomous vehicle 10. The power supply unit 190 may operate in response to a control signal received from the main ECU 240. The power supply unit 190 may include a switched-mode power supply (SMPS).

The processor 170 may be electrically connected to the memory 140, the interface 280 and the power supply unit 190 and exchange signals with them. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units for executing other functions.

The processor 170 may be driven by power provided from the power supply unit 190. The processor 170 may receive data, process data, generate signals, and provide signals in a state in which power is supplied from the power supply unit 190.

The processor 170 may receive information from other electronic devices of the autonomous vehicle 10 via the interface. The processor 170 may provide control signals to other electronic devices of the autonomous vehicle 10 via the interface.

The autonomous vehicle 10 may include at least one printed circuit board (PCB). The memory 140, the interface, the power supply unit 190 and the processor 170 may be electrically connected to the PCB.

Other electronic devices of the autonomous vehicle 10 which are connected to the interface, the AI processor 261, and the autonomous module 260 will be described in more detail below. Hereinafter, the autonomous vehicle 10 is referred to as the vehicle 10 for convenience of explanation.

The object detector 210 may generate information about objects outside the vehicle 10. The AI processor 261 may apply a neural network model to data acquired through the object detector 210 to generate at least one of information on presence or absence of an object, location information of the object, distance information of the vehicle and the object, or information on a relative speed between the vehicle and the object.

The object detector 210 may include at least one sensor which can detect an object outside the vehicle 10. The sensor may include at least one of a camera, a radar, a lidar, an ultrasonic sensor, or an infrared sensor. The object detector 210 may provide data about an object generated based on a sensing signal generated in the sensor to at least one electronic device included in the vehicle.

The vehicle 10 may transmit data acquired through the at least one sensor to the AI device 20 through the communication unit 220, and the AI device 20 may transmit, to the vehicle 10, AI processing data generated by applying the neural network model 26 to the transmitted data. The vehicle 10 may recognize information about an object detected based on received AI processing data, and the autonomous module 260 may perform an autonomous driving control operation using the recognized information.

The communication unit 220 may exchange signals with devices located outside the vehicle 10. The communication device 220 may exchange signals with at least one of infrastructures (e.g., a server, a broadcasting station, etc.), other vehicles, or terminals. The communication unit 220 may include at least one of a transmission antenna, a reception antenna, a radio frequency (RF) circuit capable of implementing various communication protocols, or an RF element in order to perform communication.

The AI processor 261 may apply the neural network model to data acquired through the object detector 210 to generate at least one of information on presence or absence of an object, location information of the object, distance information of the vehicle and the object, or information on a relative speed between the vehicle and the object.

The driving operator 230 is a device which receives a user input for driving. In a manual mode, the vehicle 10 may drive based on a signal provided by the driving operator 230. The driving operator 230 may include a steering input device (e.g., a steering wheel), an acceleration input device (e.g., an accelerator pedal), and a brake input device (e.g., a brake pedal).

In an autonomous driving mode, the AI processor 261 may generate an input signal of the driving operator 230 in response to a signal for controlling a movement of the vehicle according to a driving plan generated through the autonomous module 260.

The vehicle 10 may transmit data necessary for control of the driving operator 230 to the AI device 20 through the communication unit 220, and the AI device 20 may transmit, to the vehicle 10, AI processing data generated by applying the neural network model 26 to the transmitted data. The vehicle 10 may use the input signal of the driving operator 230 to control the movement of the vehicle based on the received AI processing data.

The main ECU 240 can control overall operation of at least one electronic device included in the vehicle 10.

The vehicle driver 250 is a device which electrically controls various vehicle driving devices of the vehicle 10. The vehicle driver 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device, and a suspension driving control device. The safety device driving control device may include a safety belt driving control device for safety belt control.

The vehicle driver 250 includes at least one electronic control device (e.g., a control electronic control unit (ECU)).

The vehicle driver 250 can control a power train, a steering device, and a brake device based on signals received from the autonomous module 260. The signals received from the autonomous module 260 may be driving control signals generated by applying the neural network model to vehicle related data in the AI processor 261. The driving control signals may be signals received from the AI device 20 through the communication unit 220.

The sensing unit 270 may sense a state of the vehicle. The sensing unit 270 may include at least one of an inertial measurement unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, or a pedal position sensor. The IMU sensor may include at least one of an acceleration sensor, a gyro sensor, or a magnetic sensor.

The AI processor 261 may apply the neural network model to sensing data generated in at least one sensor to generate state data of the vehicle. AI processing data generated using the neural network model may include vehicle pose data, vehicle motion data, vehicle yaw data, vehicle roll data, vehicle pitch data, vehicle collision data, vehicle direction data, vehicle angle data, vehicle speed data, vehicle acceleration data, vehicle inclination data, vehicle forward/reverse data, vehicle weight data, battery data, fuel data, tire pressure data, vehicle internal temperature data, vehicle internal humidity data, steering wheel rotation angle data, vehicle outside illumination data, pressure data applied to an accelerator pedal, and pressure data applied to a brake pedal, and the like.

The autonomous module 260 may generate a driving control signal based on AI-processed vehicle state data.

The vehicle 10 may transmit data acquired through the at least one sensor to the AI device 20 through the communication unit 220, and the AI device 20 may transmit, to the vehicle 10, AI processing data generated by applying the neural network model 26 to the transmitted data.

The location data generator 280 may generate location data of the vehicle 10. The location data generator 280 can include at least one of a global positioning system (GPS) and a differential global positioning system (DGPS).

The AI processor 261 can generate more accurate location data of the vehicle by applying the neural network model to location data generated in at least one location data generating device.

According to an embodiment, the AI processor 261 may perform a deep learning operation based on at least one of an inertial measurement unit (IMU) of the sensing unit 270 and a camera image of the object detector 210 and correct location data based on the generated AI processing data.

The vehicle 10 may transmit location data acquired from the location data generator 280 to the AI device 20 through the communication unit 220, and the AI device 20 may transmit, to the vehicle 10, AI processing data generated by applying the neural network model 26 to the received location data.

The vehicle 10 may include an internal communication system 50. A plurality of electronic devices included in the vehicle 10 may exchange signals by means of the internal communication system 50. The signals may include data. The internal communication system 50 may use at least one communication protocol (e.g., CAN, LIN, FlexRay, MOST, Ethernet, etc.).

The autonomous module 260 may generate a path for autonomous driving based on acquired data and generate a driving plan for driving along the generated path.

The autonomous module 260 may implement at least one advanced driver assistance system (ADAS) function. The ADAS may implement at least one of an adaptive cruise control (ACC) system, an autonomous emergency braking (AEB) system, a forward collision warning (FCW) system, a lane keeping assist (LKA) system, a lane change assist (LCA) system, a target following assist (TFA) system, a blind spot detection (BSD) system, an adaptive high beam assist (HBA) system, an auto parking system (APS), a PD collision warning system, a traffic sign recognition (TSR) system, a traffic sign assist (TSA) system, a night vision (NV) system, a driver status monitoring (DSM) system, or a traffic jam assist (TJA) system The AI processor 261 may send, to the autonomous module 260, a control signal capable of performing at least one of the aforementioned ADAS functions by applying the neural network model to information received from at least one sensor included in the vehicle, traffic related information received from an external device, and information received from other vehicles communicating with the vehicle.

The vehicle 10 may transmit at least one data for performing the ADAS functions to the AI device 20 through the communication unit 220, and the AI device 20 may send, to the vehicle 10, the control signal capable of performing the ADAS functions by applying the neural network model to the received data.

The autonomous module 260 may acquire state information of a driver and/or state information of the vehicle through the AI processor 261 and perform an operation of switching from an autonomous driving mode to a manual driving mode or an operation of switching from the manual driving mode to the autonomous driving mode based on the acquired information.

The vehicle 10 may use AI processing data for passenger assistance for driving control. For example, as described above, states of a driver and a passenger can be checked through at least one sensor included in the vehicle.

Further, the vehicle 10 can recognize a voice signal of a driver or a passenger through the AI processor 261, perform a voice processing operation, and perform a voice synthesis operation.

Description of the Present Disclosure

So far, 5G communication necessary to implement the vehicle control method according to an embodiment of the present disclosure, and contents of performing AI processing using the 5G communication and transmitting/receiving a result of AI processing have been schematically described.

Hereinafter, a method of updating an object included in a user request to a format recognizable by an application in accordance with an embodiment of the present disclosure is described in detail with reference to necessary figures.

The above-described 5G communication technology can be applied by being combined with methods described in the present disclosure to be described later, or can complement methods described in the present disclosure to make technical features of the methods concrete and clear.

FIG. 7 is a block diagram of an intelligent computing device according to an embodiment of the present disclosure.

As illustrated in FIG. 7, according to an embodiment of the present disclosure, an intelligent computing device 700 may include an object analyzer 710, an object updater 720, a database (context table) 730, and a context manager 740.

The intelligent computing device 700 may be the AI processor 21 described above with reference to FIGS. 5 and 6 and may perform functions of the AI processor 21 described above.

When the intelligent computing device 700 receives a user request (including an object), the object analyzer 710 may analyze at least one object included in the user request. For example, the object analyzer 710 may analyze whether at least one object included in the user request is a common noun or a demonstrative pronoun.

The object updater 720 may update at least one object based on a result of the object analyzer 710.

For example, the object analyzer 710 may determine a format of the received user request. Examples of the format of the user request may include a text, NLU, or a speech. As a result of determination, if the format of the user request is a first format rather than a second format that meets a recognition rule of a first assistant 701 or a second assistant 702, the object updater 720 may update the first format of the user request to the second format of the user request that meets the recognition rule of the first assistant 701 or the second assistant 702.

For another example, the object analyzer 710 may determine whether the user request is a service provided by the first assistant 701 or the second assistant 702. As a result of determination, if the user request includes a request for a service provided by the second assistant 702 different from the first assistant 701 that is being currently executed, the object updater 720 may execute the second assistant 702 while delivering an object included in the user request to the second assistant 702.

For another example, the object analyzer 710 may determine whether the object included in the user request is a common noun or a demonstrative pronoun. The object updater 720 may update the demonstrative pronoun analyzed by the object analyzer 710 so that the demonstrative pronoun can be recognized by the first assistant 701 or the second assistant 702.

First, the object updater 720 may search a context meeting the rule of the first assistant 701 or the second assistant 702 among a plurality of contexts stored in the database 730 shared by the first assistant 701 or the second assistant 702. For example, the object updater 720 may update the object included in the user request to the searched context meeting the rule of the first assistant 701 or the second assistant 702. Here, the object updater 720 may update the object to a most recently saved context among the plurality of contexts stored in the database 730.

Next, the object updater 720 may deliver the user request including the updated object to the first assistant 701 or the second assistant 702.

The context manager 740 may update the database 730 using the object included in the user request. For example, if the object included in the user request is the common noun as a result of analysis by the object analyzer 710, the context manager 740 may add the common noun included in the user request to a list of the plurality of contexts in the database 730.

Here, the context manager 740 may perform the above-described update operation based on an external input. For example, if the context manager 740 obtains a destination setting input through a map touch input or a menu input via an external input interface, the context manager 740 may perform the above-described update operation based on the obtained destination setting input.

The context manager 740 may perform the above-described update operation using a response to providing the user request to the first assistant 701 or the second assistant 702 as well as the external input. For example, the context manager 740 may obtain the response to providing the user request to the first assistant 701 or the second assistant 702 from the object updater 720 and may add at least one object included in the obtained response to the list of the plurality of contexts in the database 730. Here, the response may include text, voice, or other content data output from an assistant (e.g., POI search result or detailed data in a navigation assistant).

Meanwhile, the context manager 740 may delete some of the plurality of contexts stored in the database 730 based on a preset condition. For example, when a session related to the user request is terminated, the context manager 740 may delete a first object having a length less than or equal to a threshold from the database 730. For another example, when a deletion request for a second object having a length greater than or equal to a threshold is received from the outside, the context manager 740 may delete the second object stored in the database 730 from the database 730.

It is apparent to those skilled in the art that the various operations of the object updater 720 described above can be simultaneously performed.

FIG. 8 is a flow chart illustrating a vehicle control method according to an embodiment of the present disclosure.

As illustrated in FIG. 8, according to an embodiment of the present disclosure, an intelligent computing device (e.g., the intelligent computing device 700 of FIG. 7) can control a vehicle through a step S800 (S810, S830, S850, and S870) of FIG. 8, and this is described in detail below.

First, the intelligent computing device 700 may obtain a user request from the outside, in S810.

For example, the user request may include a text or a speech, and is not necessarily limited to this.

Next, when the user request is received, the intelligent computing device 700 may execute an application (ASSISTANT) providing a service related to the user request, in S830.

In the present disclosure, the application may be used in the same sense as an assistant or an assistant system.

Next, the intelligent computing device 700 may update the user request to be recognizable by the application and provide the updated user request to the application, in S850.

For example, the intelligent computing device 700 may analyze an object included in the user request, and may update the object included in the user request to a format, that is recognizable by the application, based on a result of the analysis. Subsequently, the intelligent computing device 700 may provide the application with the user request including the object that is updated so that the object is recognizable by the application.

Finally, the intelligent computing device 700 may provide a service related to the user request through the application, in S870.

For example, the application may be a navigation application or a weather information providing application.

A vehicle may interact with at least one robot. The robot may be an autonomous mobile robot (AMR). The AMR can move freely because it can move autonomously, and can drive by avoiding an obstacle because it is provided with a plurality of sensors for avoiding an obstacle while driving. The AMR may be a fly robot (e.g., drone) including a flying device. The AMR may be a wheel robot including at least one wheel and moving through the rotation of the wheel. The AMR may be a leg robot including at least one leg and moving using the leg.

The robot may serve as a device that supplements a vehicle user's convenience. For example, the robot may perform a function for moving a load on a vehicle up to the final destination of a user. For example, the robot may perform a function for guiding a road to the final destination to a user who got off a vehicle. For example, the robot may perform a function for transporting a user who got off a vehicle up to the final destination.

At least one electronic device included in a vehicle may communicate with the robot through a communication device.

At least one electronic device included in a vehicle may provide the robot with data processed by the at least one electronic device of the vehicle. For example, the at least one electronic device included in the vehicle may provide the robot with at least one of object data, HD map data, vehicle state data, vehicle location data and driving plan data.

At least one electronic device included in a vehicle may receive, from the robot, data processed by the robot. At least one electronic device included in a vehicle may receive at least one of sensing data, object data, robot state data, or robot location data generated by the robot and the moving plan data of the robot.

At least one electronic device included in a vehicle may generate a control signal based on data received from the robot. For example, at least one electronic device included in a vehicle may compare information on an object generated by an object detection device with information on an object generated by the robot, and may generate a control signal based on a result of the comparison. At least one electronic device included in a vehicle may generate a control signal so that interference does not occur between the moving route of the vehicle and the moving route of the robot.

At least one electronic device included in a vehicle may include a software module or hardware module implementing artificial intelligence (AI) (hereinafter referred to as an "artificial intelligence module"). At least one electronic device included in a vehicle may input obtained data to the artificial intelligence module and may use data output by the artificial intelligence module.

The artificial intelligence module may perform machine learning on input data using at least one artificial neural network (ANN). The artificial intelligence module may output driving plan data through the machine learning for the input data.

At least one electronic device included in a vehicle may generate a control signal based on data output by the artificial intelligence module.

In other embodiments, at least one electronic device included in a vehicle may receive, from an external device, data processed by artificial intelligence through a communication device. At least one electronic device included in a vehicle may generate a control signal based on data processed by artificial intelligence.

The present disclosure described above can be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, and an optical data storage device, other types of storage mediums presented herein, etc. If desired, the computer-readable medium may be implemented in the form of a carrier wave (e.g., transmission over Internet). The computer may include the processor of the terminal. Accordingly, the detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

The invention claimed is:

1. A method of controlling a vehicle, the method comprising: obtaining a request related to the controlling of the vehicle;
executing an application providing a service related to the request;
searching a database shared by a plurality of applications for a context meeting a rule of the application;
updating an object included in the request to be recognizable by the application based on the context; providing the request including the updated object to the application; providing the service through the application;
updating the database by using the object included in the request and/or a response to providing the updated request to the application;

when a session related to the request is terminated, deleting a first object having a length less than or equal to a threshold from the database; and when a deletion request for a second object having a length greater than or equal to a threshold is received from an outside, deleting the second object from the database.

2. The method of claim 1, wherein the providing of the request comprises searching the database for a context satisfying a condition related to a demonstrative pronoun when the object includes the demonstrative pronoun.

3. The method of claim 2, wherein the providing of the request comprises searching a context most recently stored in the database among contexts satisfying the condition.

4. The method of claim 1, wherein the updating of the database is performed according to a destination setting through a map touch input or a menu input.

5. The method of claim 1, wherein the providing of the request comprises updating a first format of the request to a second format based on a recognition rule of the application.

6. The method of claim 1, further comprising: when the request includes a request for another service different from the service provided by the application, executing an application corresponding to the request for the another service.

7. An computing device controlling a vehicle, comprising:
a camera provided inside the vehicle; a head-up display;
a sensing unit including at least one sensor;
a processor; and
a memory including a command executable by the processor, wherein the command is configured for:
obtaining a request related to the controlling of the vehicle;
executing an application providing a service related to the request;
searching a database shared by a plurality of applications for a context meeting a rule of the application;
updating an object included in the request to be recognizable by the application based on the context; providing the request including the updated object to the application;
providing the service through the application;
updating the database by using the object included in the request and/or a response to providing the updated request to the application;
when a session related to the request is terminated, deleting a first object having a length less than or equal to a threshold from the database; and
when a deletion request for a second object having a length greater than or equal to a threshold is received from an outside, deleting the second object from the database.

8. The intelligent computing device of claim 7, wherein the processor is further configured to search the database for a context satisfying a condition related to a demonstrative pronoun when the object includes the demonstrative pronoun.

9. The computing device of claim 8, wherein the processor is further configured to search a context most recently stored in the database among contexts satisfying the condition.

10. The computing device of claim 7, wherein the processor is further configured to perform the updating according to a destination setting through a map touch input or a menu input.

11. A non-transitory computer readable medium storing a computer executable component configured to be executed by one or more processors of a computing device, wherein the computer executable component is configured to:
obtain a request related to controlling of a vehicle;
execute an application providing a service related to the request;
search a database shared by a plurality of applications for a context meeting a rule of the application;
update an object included in the request to be recognizable by the application based on the context;
provide the request including the updated object to the application;
provide the service through the application;
update the database by using the object included in the request and/or a response to providing the updated request to the application;
when a session related to the request is terminated, delete a first object having a length less than or equal to a threshold from the database; and
when a deletion request for a second object having a length greater than or equal to a threshold is received from an outside, deleting the second object from the database.

* * * * *